United States Patent
Masuda et al.

(10) Patent No.: US 8,555,474 B2
(45) Date of Patent: Oct. 15, 2013

(54) METHOD OF MANUFACTURING CAPACITOR ELEMENT

(75) Inventors: Hidetoshi Masuda, Takasaki (JP); Taisei Irieda, Takasaki (JP); Masaru Kurosawa, Takasaki (JP); Kotaro Mizuno, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 143 days.

(21) Appl. No.: 13/189,376

(22) Filed: Jul. 22, 2011

(65) Prior Publication Data

US 2012/0017408 A1  Jan. 26, 2012

Related U.S. Application Data

(62) Division of application No. 12/238,423, filed on Sep. 25, 2008, now Pat. No. 8,023,249.

(30) Foreign Application Priority Data

Sep. 27, 2007  (JP) ................................. 2007-252782

(51) Int. Cl.
   *H01G 9/00*  (2006.01)
(52) U.S. Cl.
   USPC ........................... 29/25.42; 29/25.41; 361/303
(58) Field of Classification Search
   USPC .................... 29/25.41–25.42, 846–847, 852, 29/592.1–593; 361/303, 311
   See application file for complete search history.

(56) References Cited

U.S. PATENT DOCUMENTS

| | | | |
|---|---|---|---|
| 7,645,669 B2 | 1/2010 | Hsu et al. | |
| 8,023,249 B2 * | 9/2011 | Masuda et al. | 361/303 |
| 2007/0273263 A1 | 11/2007 | Hudspeth et al. | |
| 2008/0129178 A1 | 6/2008 | Hudspeth et al. | |
| 2008/0180883 A1 | 7/2008 | Palusinski et al. | |
| 2008/0197399 A1 | 8/2008 | Hsu et al. | |
| 2009/0034162 A1 | 2/2009 | Yawata et al. | |
| 2009/0086404 A1 * | 4/2009 | Masuda et al. | 361/303 |
| 2009/0154054 A1 | 6/2009 | Masuda et al. | |
| 2009/0195963 A1 | 8/2009 | Masuda et al. | |
| 2012/0174408 A1 * | 7/2012 | Blaustein et al. | 30/34.1 |

FOREIGN PATENT DOCUMENTS

| | | |
|---|---|---|
| JP | S61-029133 B | 7/1986 |
| JP | H03-155110 A | 7/1991 |
| JP | 2001-196263 A | 7/2001 |
| JP | 2003-011099 A | 1/2003 |
| JP | 2003-249417 A | 9/2003 |

* cited by examiner

*Primary Examiner* — Minh Trinh
(74) *Attorney, Agent, or Firm* — Law Office of Katsuhiro Arai (57) ABSTRACT

A method of manufacturing a capacitor includes: anodizing a metal substrate in two stages by applying two different voltage so as to make first and second holes having different pitches, distributed randomly in an oxide substance; filling the first and second holes with an electrode material, respectively, to form first and second electrodes; connecting the first electrodes to a conductive layer formed on one surface of the oxide substance; and connecting the second electrodes to another conductive layer formed on another surface of the oxide substance.

3 Claims, 8 Drawing Sheets

METHOD OF MANUFACTURING CAPACITOR ELEMENT

CROSS REFERENCE TO RELATED APPLICATIONS

This is a divisional application of U.S. patent application Ser. No. 12/238,423, filed Sep. 25, 2008, now U.S. Pat. No. 8,023,249, the disclosure of which is herein incorporated by reference in its entirety.

BACKGROUND OF THE INVENTION

1. Field of the Invention

The present invention relates to a capacitor and a method of manufacturing the same, and more particularly, to increase of capacitance density of a capacitor, improvement of selectivity of dielectric material and electrode metal in constructing the capacitor, and simplification of a manufacturing process of the capacitor.

2. Background Art

Al electrolytic capacitors and multi-layer ceramic capacitors are known and widely used in the art. An Al electrolytic capacitor uses electrolyte and so has a problem in structure for prevention of liquid leakage. A multi-layer ceramic capacitor requires firing and has a problem in design due to variation of a difference in thermal contraction between an electrode and a dielectric substance. Examples of techniques for implementing small and large-capacity capacitors may include a grain boundary-insulated semiconductor ceramic capacitor, which is disclosed in JP-B No. S61-29133 mentioned below, and a capacitor structure body and a method of forming the same, which are disclosed in JP-A No. 2003-249417 mentioned below.

In JP-B No. S61-29133, there is disclosed a grain boundary-insulated semiconductor ceramic capacitor including a grain boundary-insulated semiconductor ceramic having a plurality of through-holes extending opposing sections, external connection electrodes provided in the opposing sections of the grain boundary-insulated semiconductor ceramic, and electrode bodies for capacity which are made of high melting point metal and are inserted in the through-holes of the grain boundary-insulated semiconductor ceramic. The electrode bodies for capacity are conductively connected to the external connection electrodes which are different from each other.

In JP-A No. 2003-249417, there is disclosed an example of a method of forming a capacitor structure body, in which, using a porous substrate obtained by anodizing a substrate, a thin-film forming process is carried out to form a first electrode having a plurality of pillar-shaped bodies on a surface of a substrate for capacitor, a dielectric thin film formed on the surface of the first electrode in such a manner that the dielectric thin film covers the outer side of the pillar-shaped bodies, and a second electrode formed on the surface of the dielectric thin film in such a manner that the second electrode covers the outer side of the pillar-shaped bodies.

[Patent Document 1] JP-B No. S61-29133
[Patent Document 2] JP-A-2003-249417

However, the above related art have the following problems. First, in the technique disclosed in JP-B No. S61-29133 disclosing the structure in which the grain boundary-insulated semiconductor ceramic with the plurality of through-holes is used as a dielectric layer and the capacitive electrode bodies are selectively inserted in the through-holes, it is difficult to achieve large-capacity with increase of an area due to difficulty of micro-processing. In the technique disclosed in JP-A No. 2003-249417, since electrode material is attached to the porous substrate used as the mask and holes are enlarged when the porous substrate is etched, it is difficult to obtain the pillar-shaped bodies having uniform section and desired length. In addition, when the pillar-shaped bodies become lengthened, there may occur variation in film thickness of the dielectric thin film, which makes it difficult to achieve large-capacity with increased height of the pillar-shaped bodies.

SUMMARY OF THE INVENTION

To overcome at least one of the above problems, it is an object of at least one embodiment of the invention to provide a capacitor and a method of manufacturing the same, which are capable of achieving miniaturization and increase of capacitance density of the capacitor, improvement of selectivity of dielectric material and electrode metal in constructing the capacitor, and simplification of a manufacturing process of the capacitor.

To achieve the above object, according to a first aspect of the invention, there is provided a capacitor including: a pair of conductive layers that are opposed to each other at a predetermined interval; a dielectric layer that is interposed between the pair of conductive layers; a plurality of first electrodes that are disposed in some of a plurality of holes passing through the dielectric layer in a direction substantially perpendicular to the pair of conductive layers and that have respective one end portions which are electrically connected to one of the conductive layers and the respective other end portions which are insulated from the other of the conductive layers; and a plurality of second electrodes that are disposed in the remainder of the plurality of holes and that have respective one end portions which are electrically connected to the other of the conductive layers and the respective other end portions which are insulated from the one of the conductive layers. The first electrodes and the second electrodes are randomly distributed.

With this configuration, since the electrodes are formed in the holes passing through the dielectric layer in the thickness direction of the dielectric layer and the first electrodes (for example, positive poles) and the second electrodes (for example, negative poles) are randomly distributed on the conductive layers on the front and rear surfaces of the dielectric layer, it is possible to increase an area defining a capacitance and hence achieve large-capacity of a capacitor.

Preferably, the dielectric layer is made of one of oxide of valve metal, composite oxide and resin. The electrodes are insulated from the conductive layers by cleavages provided between leading ends of at least one of the first and second electrodes and the conductive layers. The electrodes are insulated from the conductive layers by insulators provided between leading ends of at least one of the first and second electrodes and the conductive layers. The insulators are made of one of metal oxide, resin and $SiO_2$.

According to a second aspect of the invention, there is provided a method of manufacturing a capacitor including an oxide substrate, which is obtained by anodizing a metal substrate, as a dielectric layer, including: a first step of forming a plurality of first holes, which have a predetermined depth and are filled with electrode material, in one main surface of the oxide substrate in a thickness direction of the oxide substrate by anodizing the metal substrate by applying a voltage to the metal substrate; a second step of forming a plurality of second holes, which have a pitch larger than that of the first holes and are randomly connected to leading ends of some of the first holes, by anodizing the metal substrate by applying a voltage, which is higher than the voltage applied in the first step, to the metal substrate; a third step of opening the leading ends of the second holes at the other main surface of the oxide substrate; a fourth step of forming a conductive seed-layer on the entirety of the one main surface of the oxide substrate; a fifth step of forming first electrodes, which do not reach the leading ends of the first holes, on the seed-layer by filling the first holes connected to the second holes with a conductor; a sixth step of opening end portions of the first holes, in which the first electrodes are not formed, by removing the seed-layer and cutting the other main surface of the oxide substrate by a thickness corresponding to the second holes; a seventh step of forming a conductive layer, which is insulated from the first electrodes, on the entirety of the other main surface of the oxide substrate; an eighth step of forming second electrodes by filling the first holes, in which the first electrodes are not formed, with a conductor in such a manner that the conductor does not reach the one main surface of the oxide substrate with the conductive layer as a seed; and a ninth step of forming another conductive layer, which is connected to the end portions of the first electrodes and is insulated from the second electrodes, on the one main surface of the oxide substrate.

With this configuration, since the structure body of the dielectric layer is first formed and the gap (hole) is later filled with the electrode material, it is possible to improve selectivity of electrode metal and achieve simplification of a manufacturing process.

Preferably, the method further includes at least one of the steps of: preparing an insulator, with which a step with the other main surface of the oxide substrate is filled, on the first electrodes formed in the fifth step; and preparing an insulator, with which a step with the one main surface of the oxide substrate is filled, on the second electrodes formed in the eighth step.

According to a third aspect of the invention, there is provided a method of manufacturing a capacitor, including: a first step of forming a plurality of first holes, which have a predetermined depth and are filled with electrode material, in one main surface of an oxide substrate in a thickness direction of the oxide substrate by anodizing a metal substrate by applying a voltage to the metal substrate; a second step of forming a plurality of second holes, which have a pitch larger than that of the first holes and are randomly connected to leading ends of some of the first holes, by anodizing the metal substrate by applying a voltage, which is higher than the voltage applied in the first step, to the metal substrate; a third step of opening the leading ends of the second holes at the other main surface of the oxide substrate; a fourth step of forming a conductive seed-layer on the entirety of the one main surface of the oxide substrate; a fifth step of forming some of first electrodes on the seed-layer by partially filling the first holes connected to the second holes with a conductor; a sixth step of opening end portions of all of the first holes by cutting the other main surface of the oxide substrate by a thickness corresponding to the second holes: a seventh step of forming the first electrodes, which reach the other end portion of the oxide substrate, which is cut in the sixth step, and second electrodes, which do not reach the cut other end portion, on the seed-layer by filling the plurality of first holes with a conductor; an eighth step of removing the oxide substrate; a ninth step of forming a dielectric layer by filling a gap, which is produced between the first and second electrodes in the eighth step, with a high permittivity material so as to expose end portions of the first electrodes and cover end portions of the second electrodes; a tenth step of forming a conductive layer, which is connected to the end portions of the first electrodes, on a main surface of the dielectric layer opposing the seed-layer and removing the seed-layer from the main surface of the dielectric layer; an eleventh step of forming a step between the end portions of the first electrodes and the main surface of the dielectric layer by cutting the end portions of the first electrodes by a predetermined thickness in the main surface of the dielectric layer from which the seed-layer is removed; and a twelfth step of forming another conductive layer, which is connected to the end portions of the second electrodes and is insulated from the end portions of the first electrodes, on the main surface of the dielectric layer from which the seed-layer is removed.

With this configuration, with the structure body of the oxide substrate, which is made of anodic oxide of metal and has a plurality of holes, as a mold, since the electrodes are formed in the plurality of holes of the dielectric layer while transferring any structure body into the dielectric layer, and the first electrodes (for example, positive poles) and the second electrodes (for example, negative poles) are randomly distributed on the conductive layers on the front and rear surfaces of the dielectric layer, it is possible to increase an area defining a capacitance and hence achieve large-capacity of a capacitor. In addition, since the gap of the structure body of the oxide substrate formed by the anodization is later filled with the electrode material, it is possible to improve selectivity of electrode metal and achieve simplification of a manufacturing process. Further, since the oxide substrate is removed and the gap is filled with any dielectric material, it is possible to improve selectivity of dielectric material and alter dielectric material depending on use of a capacitor.

Preferably, the high permittivity material is one of oxide of valve metal, composite oxide and resin. The high permittivity material is oxide of valve metal which has permittivity higher than that of the removed oxide substrate. The method further includes the step of preparing an insulator, which covers the end portion of the first electrode, in the step formed in the eleventh step. The insulator is made of one of metal oxide, resin and $SiO_2$.

According to a fourth aspect of the invention, there is provided a capacitor formed by the method according to the second aspect of the invention. The above and other objects, features and advantages of the disclosed embodiments of the invention will become more fully apparent from the following detailed description and the accompanying drawings.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not to scale.

DESCRIPTION OF THE PREFERRED EMBODIMENTS

Hereinafter, preferred embodiments of the present invention will be described in detail. The preferred embodiments are not intended to limit the present invention.

In the present disclosure where conditions and/or structures are not specified, the skilled artisan in the art can readily provide such conditions and/or structures, in view of the present disclosure, as a matter of routine experimentation. Further, the anodic oxidation technology disclosed in U.S. patent application Ser. No. 12/139,444, filed Jun. 13, 2008, now U.S. Pat. No. 8,064,189 and U.S. patent application Ser. No. 12/139,450, filed Jun. 13, 2008, now U.S. Pat. No. 8,134,826, by the same assignee as in the present application can be used and modified, the disclosure of which is herein incorporated by reference in their entirety.

The present invention will be explained in detail with reference to specific examples which are not intended to limit the present invention. The numerical numbers applied in specific examples may be modified by a range of at least ±50%, wherein the endpoints of the ranges may be included or excluded.

Embodiment 1

Figure 1:
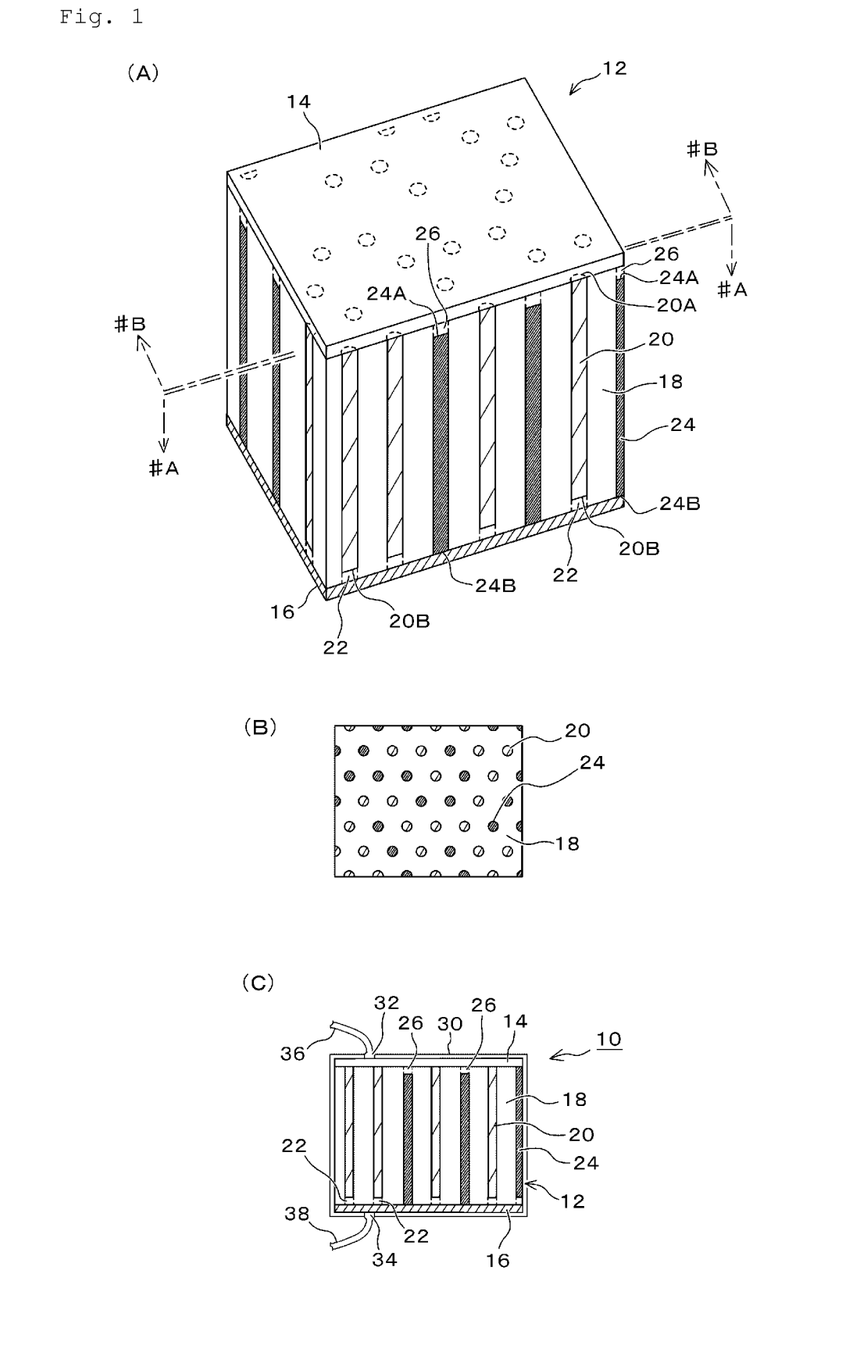
FIG. 1A is a perspective view showing an external appearance of a capacitor element according to Embodiment 1 of the present invention.
FIG. 1B is a sectional view taken along line #A-#A and viewed in an arrow direction in FIG. 1A.
FIG. 1C is a sectional view of a capacitor according to Embodiment 1, which is taken along line #B-#B and viewed in an arrow direction in FIG. 1A.
Figure 2:
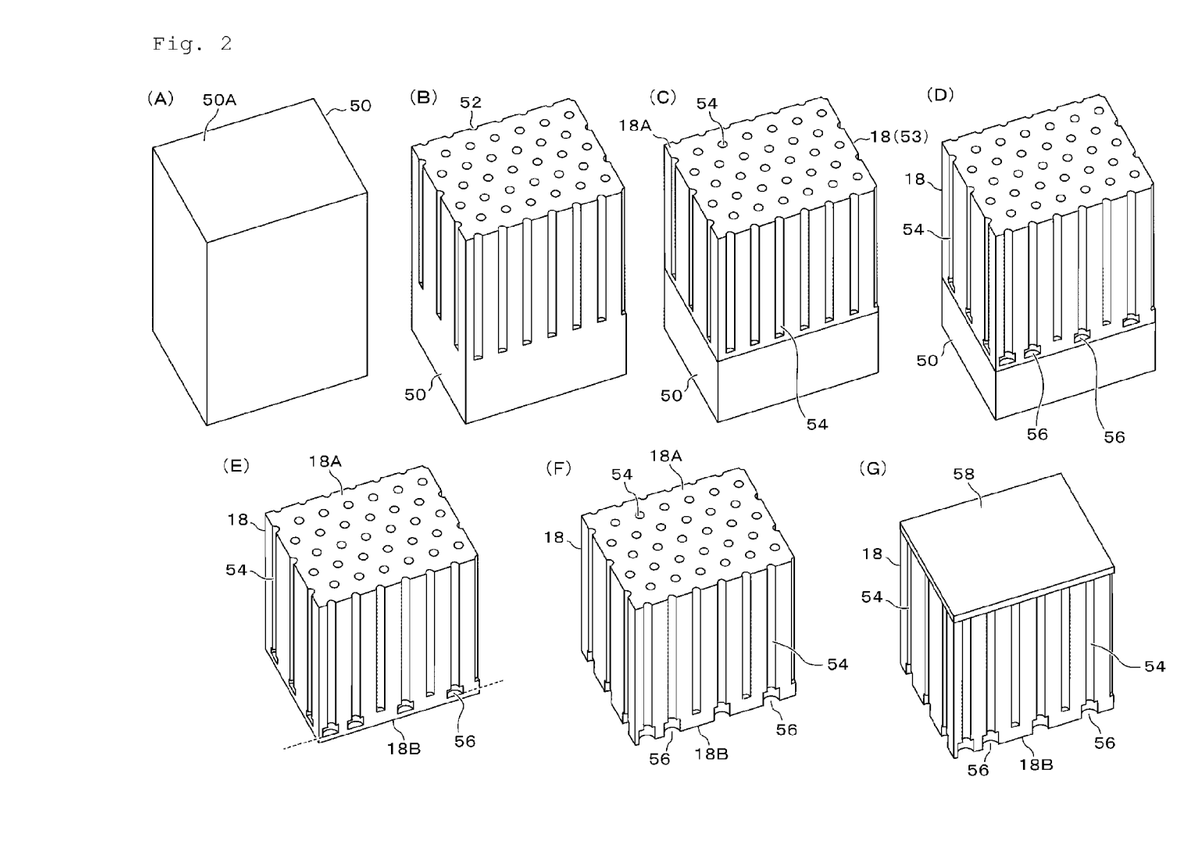
FIGS. 2A to 2G are views showing an exemplary manufacturing process of Embodiment 1.
Figure 3:
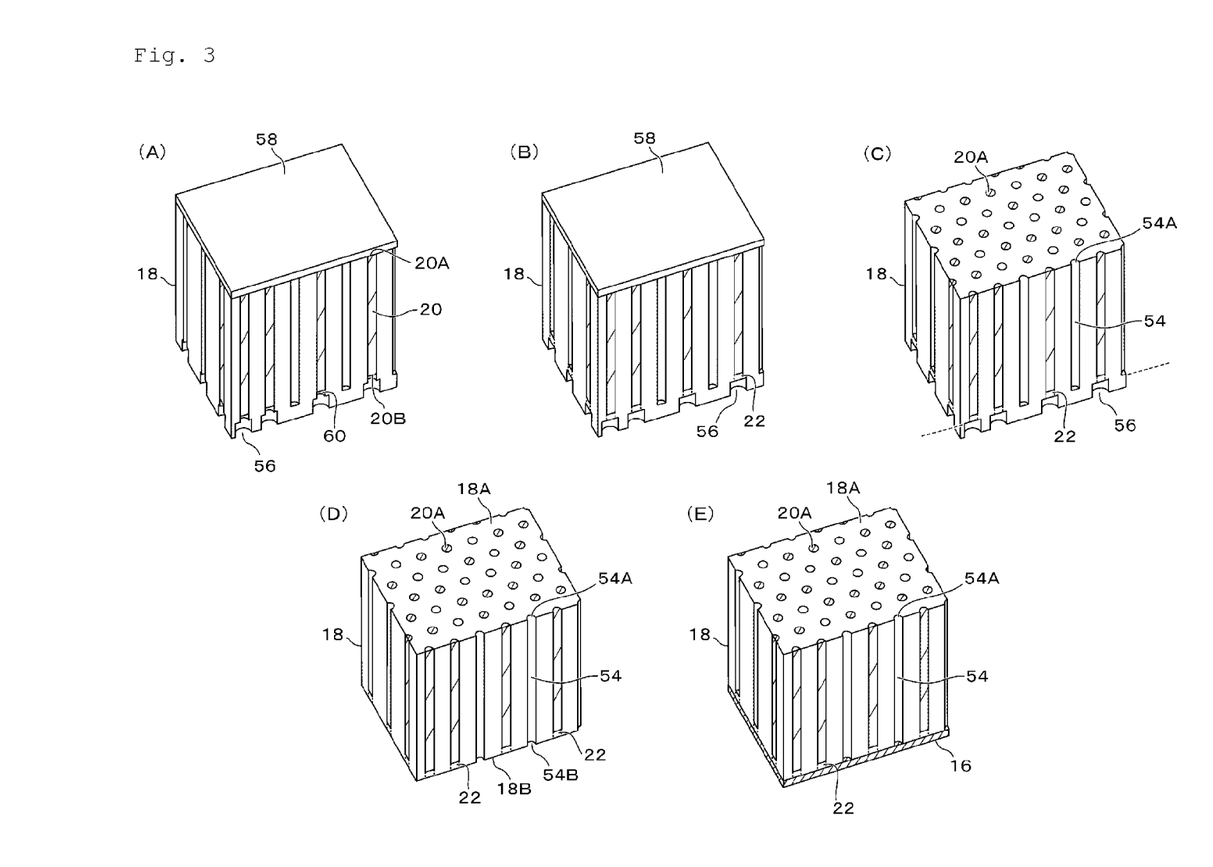
FIGS. 3A to 3E are views showing another exemplary manufacturing process of Embodiment 1.
Figure 4:
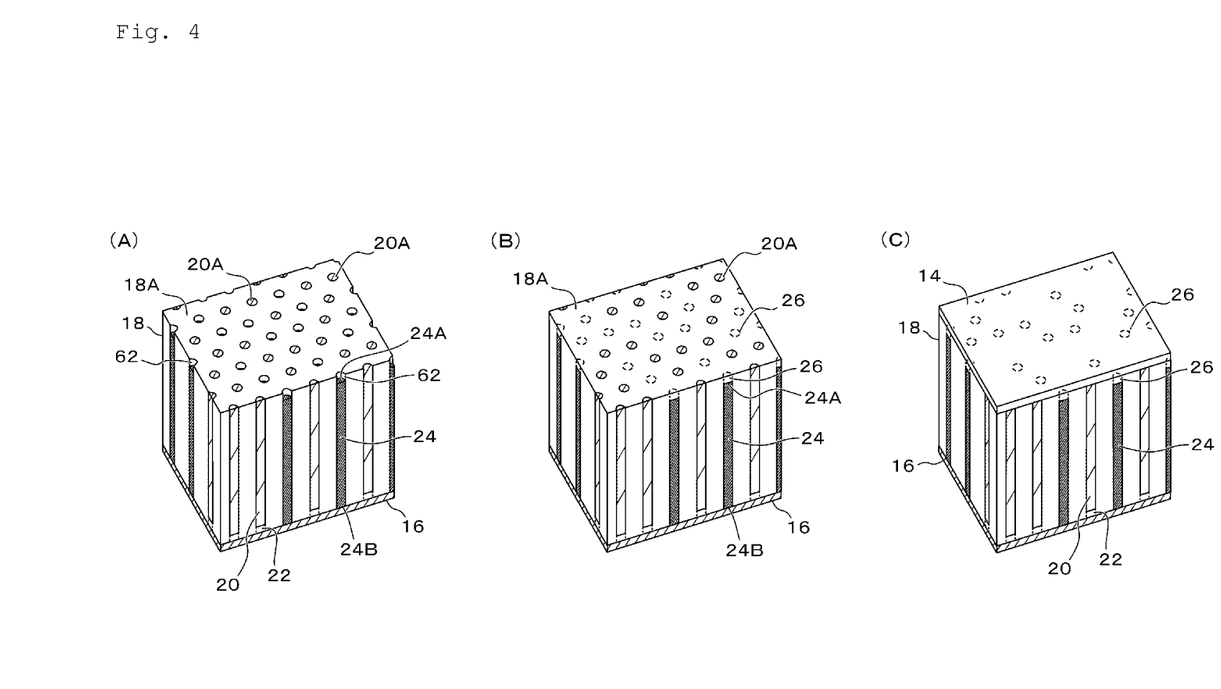
FIGS. 4A to 4C are views showing still another exemplary manufacturing process of Embodiment 1.
Figure 5:
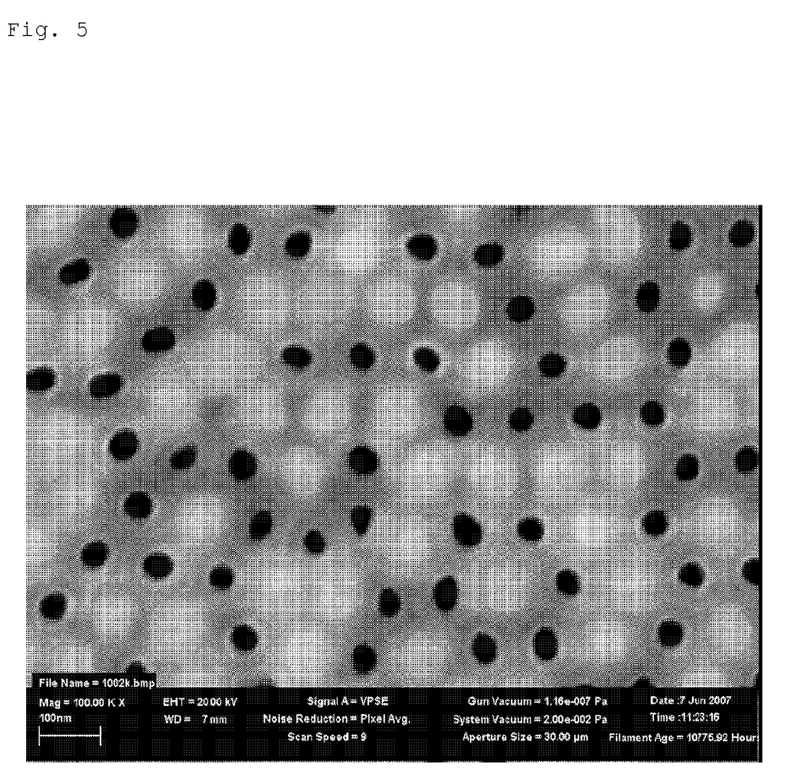
FIG. 5 shows a SEM image having a two dimensional section observed in the course of manufacturing the capacitor element of Embodiment 1.

First, Embodiment 1 of the present invention will be described with reference to FIGS. 1 to 5. FIG. 1A is a perspective view showing an external appearance of a capacitor element according to Embodiment 1, FIG. 1B is a sectional view taken along line #A-#A and viewed in an arrow direction in FIG. 1A, and FIG. 1C is a sectional view of a capacitor according to Embodiment 1, which is taken along line #B-#B and viewed in an arrow direction in FIG. 1A. FIGS. 2 to 4 are views showing exemplary manufacturing processes of Embodiment 1, and FIG. 5 shows a SEM image having a two dimensional section observed in the course of manufacturing the capacitor element of Embodiment 1.

A capacitor 10 of this embodiment is configured with a capacitor element 2 as a main component, as shown in FIG. 1. The capacitor element 12 includes a pair of conductive layers 14 and 16 which are opposed to each other at a predetermined interval, a dielectric layer 18 interposed between the conductive layers 14 and 16, and a plurality of first electrodes 20 and second electrodes 24. The first electrodes 20 and the second electrodes 24 are substantially perpendicular to the conductive layers 14 and 16 and have a large aspect ratio. One end portion 20A of each of the first electrodes 20 is connected to the conductive layer 14 and the other end portion 20B is insulated from the conductive layer 16 by an insulation cap 22. One end portion 24B of each of the second electrodes 24 is connected to the conductive layer 16 and the other end portion 24A is insulated from the conductive layer 14 by an insulation cap 26. The first electrodes 20 and the second electrodes 24 are randomly arranged, as shown in FIG. 1B.

Materials used to form the dielectric layer 18 may include oxides of valve metal (for example, Al, Ta, Nb, Ti, Zr, Hf, Zn, W, Sb, etc.). The conductive layers 14 and 16 may be made of general metal (for example, Cu, Ni, Cr, Ag, Au, Pd, Fe, Sn, Pb, Pt, Ir, Rh, Ru, Al, etc.). The first electrodes 20 and the second electrodes 24 may be made of platable general metal (for example, Cu, Ni, Co, Cr, Ag, Au, Pd, Fe, Sn, Pb, Pt, etc.) and alloys thereof. The insulation caps 22 and 26 may be made of, for example, oxides of valve metal (for example, Al, Ta, Nb, Ti, Zr, Hf, Zn, W, Sb, etc.), electrodeposited $TiO_2$, electrodeposited resin (for example, polyimide, epoxy, acryl, etc.), $SiO_2$, etc.

As examples of dimension for the components of the capacitor element 12, an interval between the conductive layer 14 and the conductive layer 16 (i.e., thickness of the dielectric layer 18) is several 100 nm to several 100 μm and thickness of each of the conductive layer 14 and 16 is several 10 nm to several μm. Diameter of each of the first electrodes 20 and second electrodes 24 is several 10 nm to several 100 nm, and length thereof is several 100 nm to several 100 μm, and an interval between adjacent electrodes is several 10 nm to several 100 nm. In addition, thickness of each of the insulation caps 22 and 26 is several 10 nm to several 10 μm.

The capacitor element 12 as constructed above is entirely coated with an insulating film 30 (exterior protective material) and is connected from openings, which are provided in predetermined positions of the insulating film 30, to leading portions 36 and 38 such as lead wires via connected lands 32 and 34, as shown in FIG. 1C. The insulating film 30 may be made of, for example, $SiO_2$, SiN, resin, metal oxide, etc., and its thickness is several 10 nm to several 10 μm.

Next, a method of manufacturing the capacitor 10 according to this embodiment will be described with reference to FIGS. 2 to 4. First, a metallic substrate 50 made of the above-mentioned valve metal is prepared, as shown in FIG. 2A, and then pits 52, which become starting points of anodic oxidation, are formed in closest packing hexagonal array on a surface 50A of the metallic substrate 50, as shown in FIG. 2B. Next, first holes 54 are formed at desired depth (or length) in a thickness direction of the metallic substrate 50 by subjecting the metallic substrate 50 to anodization under application of a voltage to the metallic substrate 50, as shown in FIG. 2C. Subsequently, second holes 56 are formed by subjecting the metallic substrate 50 to anodization under application of a voltage, which is lager than the voltage applied for the first holes 54, to the metallic substrate 50, thereby completing the dielectric layer 18 constituted by an oxide substrate 53, as shown in FIG. 2D. Since a pitch of the holes (an interval between the holes) formed by the anodization is proportional to a voltage, a pitch of the second holes 56 formed under a larger voltage become large and accordingly are randomly connected to some of the first holes 54 formed in the previous process.

In connection with the anodization, the first anodization shown in FIG. 2C is carried out under conditions of application voltage of several V to several 100 V and processing time of several minutes to several days, and the second anodization shown in FIG. 2D is carried out under conditions of application voltage, which is several times (e.g., 2-5 times) as large as the first application voltage and processing time of several minutes to several tens minutes (which is shorter than that of the first anodization). For example, the first holes 54 are formed at diameter of about 30 nm (typically 30 nm to 40 nm) if the first application voltage is 40V, while the second holes 56 are formed at diameter of about 70 nm (typically 60 nm to 80 nm) if the second application voltage is 80V. When the second application voltage falls within the above-mentioned range, the number of first holes 54 connected to the second holes 56 may become substantially equal to the number of first holes 54 not connected to the second holes 56. Accordingly, the number of first electrodes 20 formed within the first holes 54 connected to the second holes 56 may become substantially equal to the number of second electrodes 24 formed within the first holes 54 not connected to the second holes 56, thereby making it possible to take out capacity of the capacitor with efficiency. In addition, when the second processing time falls within the above-mentioned range, sufficient transformation of the pitch of the holes can be achieved to decrease thickness of the oxide substrate formed in the second anodization. Since the oxide substrate formed in the second anodization is removed in a later process, it is preferably as thin as possible (typically 50 nm to 5 µm). The thickness of the oxide substrate formed in the first anodization may be 100 nm to 1000 µm in an embodiment.

Next, under the condition shown in FIG. 2D, a base metal portion of the metallic substrate 50 is removed, the dielectric layer 18 is cut away by a predetermined thickness, as shown in FIG. 2E, and end portions of the second holes 56 are opened in a rear surface 18B of the dielectric layer 18, as shown in FIG. 2F. Then, as shown in FIG. 2G, a seed-layer 58 made of a conductor is formed on a front surface 18A of the dielectric layer 18 by an appropriate method such as PVD or the like. Next, as shown in FIG. 3A, the first electrodes 20 are formed by filling the first holes 54, which are connected to the second holes 56, with a plating conductor, using the seed-layer 58 as a seed. At this point, since the end portions of the first holes 54 not connected to the second holes 56 are opened, the first holes 54 not connected to the second holes 56 are not filled with the plating conductor. The filling of the plating conductor is carried out up to a position where the end portions 20B of the first electrodes 20 form appropriate cleavages 60 without extending to the second holes 56. Then, as shown in FIG. 3B, the insulating caps 22 are formed in the cleavages 60 by an appropriate method such as anodization, oxide electrodeposition, resin electrodeposition or the like.

FIG. 5 shows a SEM image having a two dimensional section observed after the process shown in FIG. 3A. In FIG. 5, white portions indicate first holes 54 filled with a plating conductor (Ni and the like), black portions indicate first holes 54 not filled with a plating conductor, and gray portions indicate the dielectric layer 18 (or the oxide substrate 53). As can be seen from FIG. 5, the holes 54 filled with the plating conductor and the holes 54 not filled with the plating conductor are randomly distributed with no partiality.

Next, as shown in FIG. 3C, the seed-layer 58 is removed, and then the rear surface 18B of the dielectric layer 18 is cut away by a thickness corresponding to the second holes 56, as indicated by a dotted line in this figure, so that the end portions 54B of the first holes 54 in which the first electrodes 20 are not formed, are opened, as shown in FIG. 3D. Then, as shown in FIG. 3E, the conductive layer 16 is formed in the rear surface 18B of the dielectric layer 18 by an appropriate method such as PVD or the like, and then, as shown in FIG. 4A, the second electrodes 24 are formed by filling the first holes 54, in which the first electrodes 20 are not formed, with a plating conductor, using the conductive layer 16 as a seed. At this point, the filling of the plating conductor is carried out up to a position where the end portions 24A of the second electrodes 24 form appropriate cleavages 62 between the end portions 24A and the front surface 18A of the dielectric layer 18. Then, as shown in FIG. 4B, the insulating caps 26 are formed in the cleavages 62 by an appropriate method such as anodization, oxide electrodeposition, resin electrodeposition or the like. Thereafter, as shown in FIG. 4C, the conductive layer 14 is formed on the front surface 18A of the dielectric layer 18, thereby completing the capacitor element 12 in which the first electrodes 20 are electrically connected to the conductive layer 14 and the second electrodes 24 are electrically connected the conductive layer 16.

With the above-described configuration and operation, Embodiment 1 has the following effects.

(1) Since the first electrodes 20 and the second electrodes 24 are formed into a substantially pillar-shape to increase an opposing area of a conductor, it is possible to achieve large capacity of the capacitor.

(2) Since the first electrodes 20 and the second electrodes 24 are randomly distributed, it is easy to manufacture these electrodes. For example, if either the first electrodes 20 or the second electrodes 24 are arranged at vertexes of hexagonal honeycomb structures and the other electrodes are arranged at centers of the hexagonal honeycomb structures, even when holes are to be lengthened to fill these electrodes, since a difference in growth between the holes is vanished, it is difficult to manufacture these electrodes. However, in this embodiment, the pillar-shaped electrodes can be lengthened by employing the above-described two-staged anodizations.

(3) Since the insulating caps 22 and 26 are used for random distribution of the electrodes, the area of the end portions 20B of the first electrodes 20 and the area of the end portions 24A of the second electrodes 24 can be also used for increase of the capacity of the capacitor 10.

(4) Since the first holes 54 are filled with the first electrodes 20 and the second electrodes 24 after the first holes 54 are formed in the dielectric layer 18 constituted by the oxide substrate 53, it is possible to improve selectivity of electrode material and simplify a manufacturing process.

Embodiment 2

Figure 6:
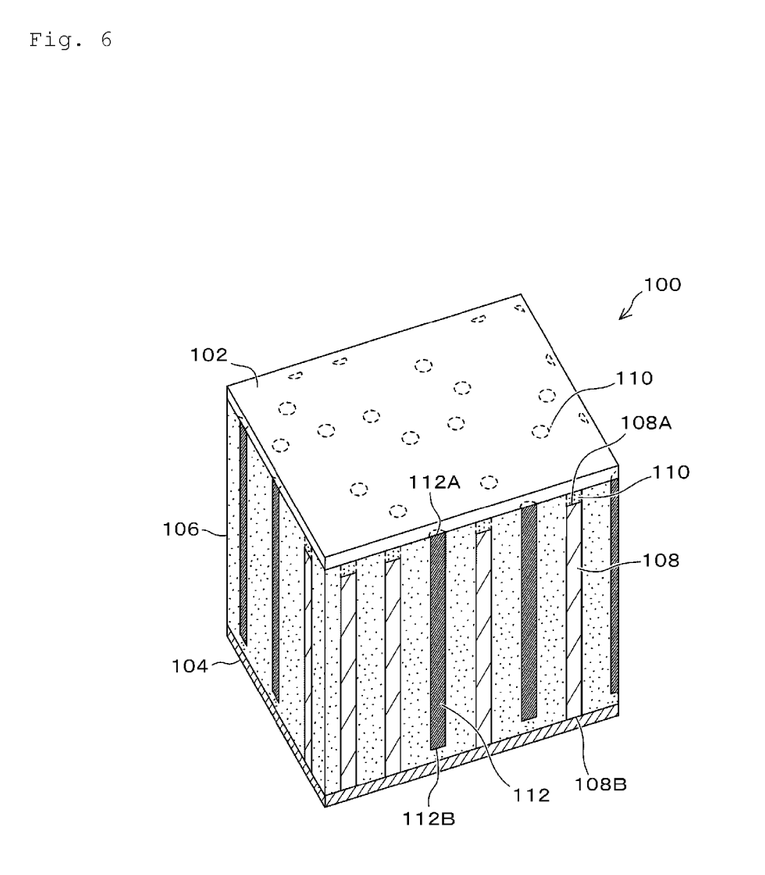
FIG. 6 is a perspective view showing an external appearance of a capacitor element according to Embodiment 2 of the present invention.
Figure 7:
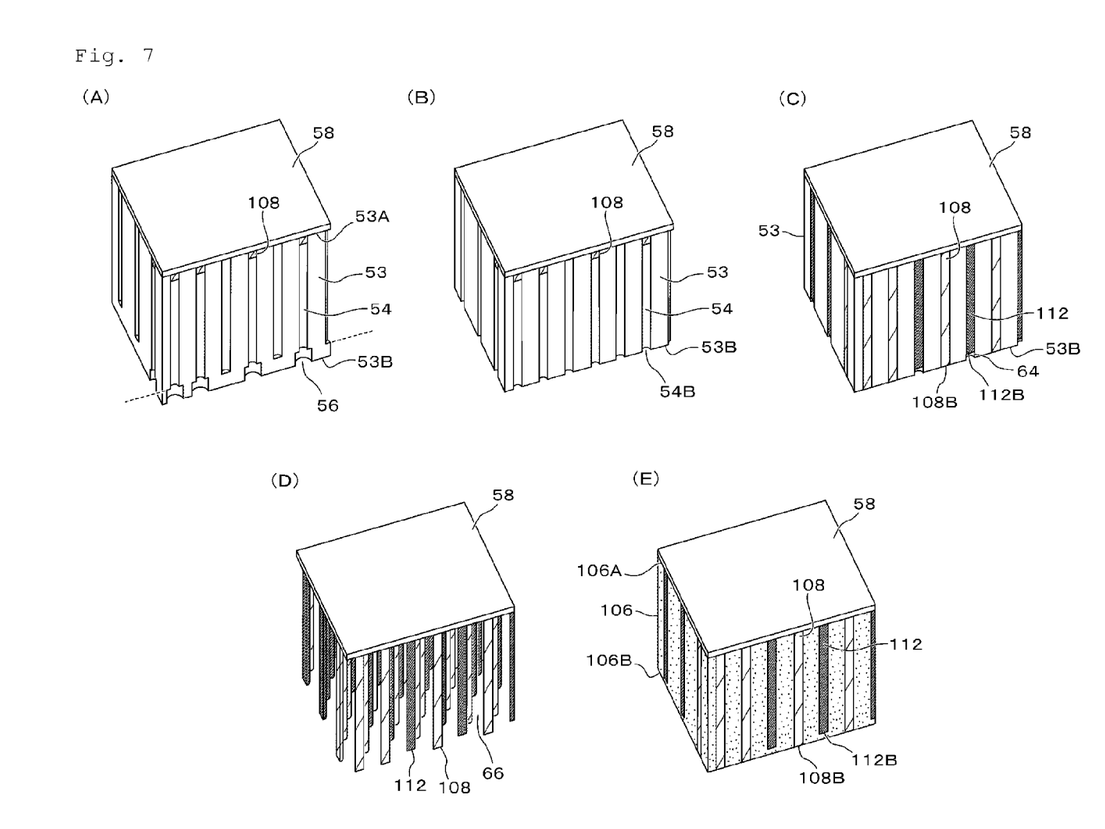
FIGS. 7A to 7E are views showing an exemplary manufacturing process of Embodiment 2.
Figure 8:
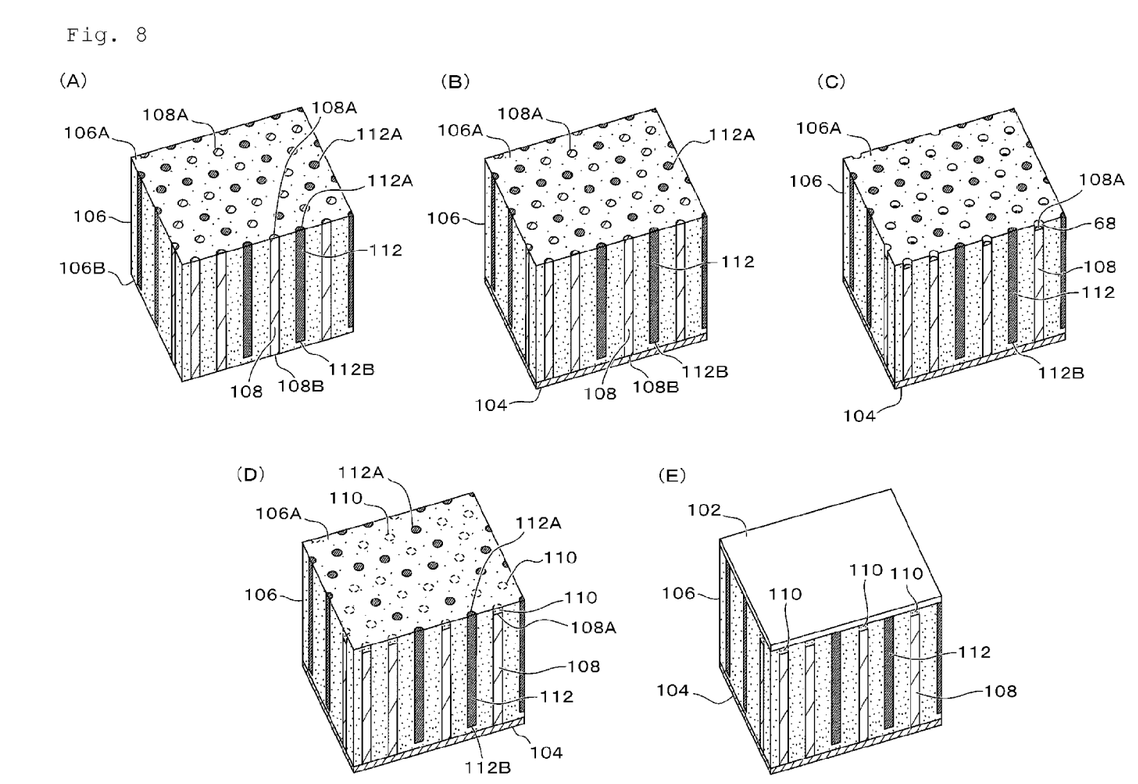
FIGS. 8A to 8E are views showing another exemplary manufacturing process of Embodiment 2.

Next, Embodiment 2 of the present invention will be described with reference to FIGS. 6 to 8. FIG. 6 is a perspective view showing an external appearance of a capacitor element according to this embodiment, and FIGS. 7 to 8 are views showing exemplary manufacturing processes of this embodiment. In these figures, the same components as Embodiment 1 are denoted by the same reference numerals. As shown in FIG. 6, a capacitor element 100 of this embodiment includes a pair of opposing conductive layers 102 and 104, a dielectric layer 106 which is made of high permittivity material and is interposed between the pair of conductive layers 102 and 104, and a plurality of first electrodes 108 and second electrodes 112 with which a plurality of holes formed in the dielectric layer 106 are filled.

The first electrodes 108 and the second electrodes 112 are randomly distributed like Embodiment 1. An insulation cap 110 is formed between one end portion 108A of each of the first electrode 108 and the conductive layer 102 and the dielectric layer 106 interposed between one end portion 112B of each of the second electrode 112 and the conductive layer 104. In this manner, the insulation caps 110 and the dielectric layer 106 insulate the first electrodes 108 and the second electrodes 112 from the conductive layers 102 and 104, thereby providing random distribution of the electrodes. The capacitor element 100 of this embodiment is coated with an insulating film (exterior protective material (not shown)) if necessary, like Embodiment 1. The dimension of components of the capacitor element 100 is the same as the dimension in Embodiment 1.

Material used for the conductive layers 102 and 104, the first electrodes 108, the second electrodes 112 and the insulating film is the same as that in Embodiment 1. An example of the high permittivity material used to form the dielectric layer 106 may include oxide of valve metal (for example, Al, Ta, Nb, Ti, Zr, Hf, Zn, W, Sb, etc.), for example, $Ta_2O_5(25)$, $TiO_2(80)$, $Nb_2O_5(60)$, $ZrO_2(27)$, $HfO_2(25)$ or the like (numbers in parentheses indicate permittivity), composite oxide (for example, $Ba_xSr_{1-x}$) $TiO_3$(300 to 1200), $SrTiO_3$(300), resin or the like. The insulation caps 110 may be made of metal oxide, electrodeposition resin (for example, polyimide, epoxy, acryl or the like), $SiO_2$, etc. The metal oxide may include, for example, oxide of valve metal (Al, Ta, Nb, Ti, Zr, Hf, Zn, W, Sb, etc.), electrodeposited $TiO_2$, composite oxide having an $ABO_3$ structure, etc. In addition, the insulation caps 110 may be formed by the same material as the dielectric layer 106.

Next, a manufacturing method of this embodiment will be described with reference to FIGS. 7 and 8. This manufacturing method includes two-staged anodization for a metallic substrate and processes of opening the second holes 56 in the rear surface 53B of the oxide substrate 53 and forming the seed-layer 58 on the front surface 53A of the metallic substrate 53, like Embodiment 1 mentioned above. FIG. 7 shows processes subsequent to the processes in Embodiment 1. After the processes of FIGS. 2A to 2G, as shown in FIG. 7A, a part of the first electrodes 108 is formed by filling the first holes 54 connected to the second holes 56 with a plating conductor halfway, with the seed-layer 58, which is formed on the front surface 53A of the oxide substrate 53, as a seed. After forming the part of the first electrodes 108, the filling of the conductor is stopped, the rear surface 53B of the oxide substrate is cut away by a thickness corresponding to the second holes 56, as indicated by a dotted line in FIG. 7A, and then, the end portions 54B of the first holes 54 are opened, as shown in FIG. 7B.

Subsequently, using the seed-layer 58 as a seed, a plating process is carried out to fill all of the first holes 54 with a plating conductor, thereby forming the first electrodes 108 and the second electrodes 112, as shown in FIG. 7C. The filling of the plating conductor is carried out until the end portions 108B of the first electrodes 108 reach the rear surface 53B of the oxide substrate 53. Since the first electrodes 108 have been partially formed in the previous process, there is a difference in length between the first electrodes 108 and the second electrodes 112. When the filling of the conductor is stopped at an earlier point when the end portions 108B of the first electrodes 108 reach the rear surface 53B of the oxide substrate, the end portions 112B of the second electrodes 112 do not reach the rear surface 53B of the oxide substrate, thereby forming a cleavage 64.

Next, with the first electrodes 108 and the second electrodes 112 left, the oxide substrate 53 is removed, as shown in FIG. 7D, and the dielectric layer 106 is formed by filling a gap 66 with high permittivity material, as shown in FIG. 7E. The oxide substrate 53 is removed by, for example, etching. If the oxide substrate 53 is made of $Al_2O_3$ and the first electrodes 108 and the second electrodes 112 are made of Ni, it is possible to remove only $Al_2O_3$ under a process by a NaOH solution. The filling of the high permittivity material is carried out by, for example, a CVD method, a sol-gel method or the like. The gap 66 is filled with the high permittivity material in such a manner that the high permittivity material covers the end portions 112B of the second electrodes 112 while exposing the end portions 108B of the first electrodes 108. Next, the seed-layer 58 is removed, as shown in FIG. 8A, the conductive layer 104 is formed on the rear surface 106B of the dielectric layer 106 at a side opposing the seed-layer 58, as shown in FIG. 8B. While the conductive layer 104 is connected to the end portions 108B of the first electrodes 108, it is insulated from the end portions 112B of the second electrodes 112 by the existence of the dielectric layer 106.

Subsequently, an electrolytic etching is carried out with the conductive layer 106 as a feeding power layer, and the other end portions 108A of the first electrodes 108 are selectively etched to form steps 68 between the end portions 108A and the front surface 106A of the dielectric layer 106, as shown in FIG. 8C. Then, the insulation caps 110 are formed in the steps 68 by an appropriate method such as anodization, oxide electrodeposition, resin electrodeposition or the like, as shown in FIG. 8D, and then, the conductive layer 102 is formed on a surface of the insulation caps 110 by an appropriate method such as PVD or the like, as shown in FIG. 8E. While the conductive layer 102 is connected to the end portions 112A of the second electrodes 112, it is insulated from the end portions 108A of the first electrodes 108 by the existence of the insulation caps 110.

With the above-described configuration and operation, Embodiment 2 has the following effects in addition to the effects of Embodiment 1.

(1) Since the dielectric layer 106 is made of the high permittivity material, it is possible to achieve large-capacity of the capacitor. For example, if the oxide substrate 53 is made of $Al_2O_3$ having permittivity of 10 or so and is used as a capacitive material, the capacitance of the capacitor is defined by $Al_2O_3$, while, in this embodiment, the holes are filled with the material having permittivity higher than that of the oxide substrate 53, thereby making it possible to form a capacitor having permittivity higher than that of the oxide substrate 53 used as a mold.

(2) Since the oxide substrate 53 is removed after forming the first electrodes 108 and the second electrodes 112 and then the gap 66 is filled with the high permittivity material, it is possible to improve selectivity of material for the dielectric layer 106 and change dielectric material depending on use of capacitors.

The present invention is not limited to the above-described embodiments but may be modified in different ways without departing from the spirit and scope of the present invention. For example, the skilled artisan would understand that the disclosed embodiments can be modified as follows, for example.

(1) The shape and dimension shown and described in the above embodiments are only for the purpose of illustration and may be modified where appropriate or if necessary.

(2) The material described in the above embodiments is also for the purpose of illustration and may be any material known in the art. For example, although aluminum is used for the metallic substrate used for forming the dielectric layer 18, any other metal known in the art may be applied as long as it can be anodized.

(3) The electrode leading structure described in Embodiment 1 is also for the purpose of illustration and may be appropriately modified in design to show the same effects.

(4) The manufacturing processes described in the above embodiments are also for the purpose of illustration and may be appropriately modified to show the same effects. For example, which to form first, the front surface or the rear surface, depends on use and need.

(5) Although the insulation is achieved by the insulation caps 22 and 26 in Embodiment 1, this is also for the purpose of illustration. The conductive layer 16 may be directly formed in the processes shown in FIGS. 3C to 3E after the process shown in FIG. 3A with omission of the process shown in FIG. 3B, and may be insulated from the first electrodes 20 using the cleavage 60 formed in the process of FIG. 3A as an air-gap. Also for the insulation of the second electrodes 24 from the conductive layer 14 or Embodiment 2, the electrodes may be randomly distributed using such an air-gap.

Although the insulation caps 22, 26 and 110 are formed by the anodization, the oxide electrodeposition or the resin electrodeposition in the above embodiments, this is also for the purpose of illustration and may be modified to show the same effects. For example, after the process shown in FIG. 3A, $SiO_2$ may be electrodeposited through the first electrodes 20 exposed to the bottom of the cleavage 60, or once catalyst metal such as Sn—Pd is electrodeposited on the electrode end portions 20B, $SiO_2$ may be precipitated by electroless based on this electrodeposition. In addition, resin may be coated to fill the cleavage 60 and only resin on a surface may be removed by etching or polishing such that resin is left in the cleavage 60. In addition, insulator may be formed to fill the cleavage 60 and only insulator on a surface may be removed by etching or polishing such that insulator is left in the cleavage 60. This may be true of the other insulation cap 26 or embodiment 2.

According to at least one embodiment of the present invention, since (1) the electrodes are formed in the holes passing through the dielectric layer in the thickness direction and the first electrodes (for example, positive poles) and the second electrodes (for example, negative poles) are randomly distributed on the conductive layers on the front and rear surfaces of the dielectric layer, or (2) with a structure body of the oxide substrate, which is made of anodic oxide of metal and has a plurality of holes, as a mold, the electrodes are formed in the plurality of holes of the dielectric layer while transferring the structure body into the dielectric layer, and the first electrodes (for example, positive poles) and the second electrodes (for example, negative poles) are randomly distributed on the conductive layers on the front and rear surfaces of the dielectric layer, the present invention can be effectively applied to any capacitors.

The present application claims priority to Japanese Patent Application No. 2007-252782, filed Sep. 27, 2007, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A method of manufacturing a capacitor, comprising:
a first step comprising forming a plurality of first holes, which have a determinable depth and are filled with an electrode material, in one main surface of an oxide substrate in a thickness direction of the oxide substrate by anodizing a metal substrate by applying a voltage to the metal substrate;
a second step comprising forming a plurality of second holes, which have a pitch larger than that of the first holes and are connected to leading ends of some of the first holes at random, by anodizing the metal substrate by applying a voltage, which is higher than the voltage applied in the first step, to the metal substrate;
a third step comprising opening the leading ends of the second holes at another main surface of the oxide substrate;
a fourth step comprising forming a conductive seed-layer on the entirety of the one main surface of the oxide substrate;
a fifth step comprising partially forming first electrodes on the seed-layer by partially filling the first holes connected to the second holes with a conductor;
a sixth step comprising opening end portions of all of the first holes by cutting the another main surface of the oxide substrate by a thickness corresponding to the second holes; and
a seventh step comprising forming the first electrodes, which reach the cut surface of the oxide substrate, which is cut in the sixth step, and second electrodes, which do not reach the cut surface, on the seed-layer by filling all of the plurality of first holes with a conductor, so that one conductive layer can be formed on the another main surface, which conductive layer is connected to the end portions of the first electrodes but is not connected to the end portions of the second electrodes which do not reach the cut surface, said one conductive layer being used for etching the end portions of the first electrodes on the one main surface so that upon removing the seed-layer, another conductive layer can be formed on the one main surface, which another conductive layer is connected to the end portions of the second electrodes but is not connected to the end portions of the first electrodes.

2. The method according to claim 1, further comprising
an eighth step comprising forming one conductive layer on the another main surface so that the one conductive layer is connected to the end portions of the first electrodes but is not connected to the end portions of the second electrodes which do not reach the cut surface;
a ninth step comprising removing the seed-layer from the one main surface and etching the end portions of the first electrodes on the one main surface using the one conductive layer; and
a tenth step comprising forming another conductive layer on the one main surface so that the another conductive layer is connected to the end portions of the second electrodes but is not connected to the end portions of the first electrodes.

3. The method according to claim 2, further comprising electrodepositing an insulating material on the etched end portions of the first electrodes using the one conductive layer.

* * * * *